United States Patent [19]

Youngner

[11] 4,444,623

[45] Apr. 24, 1984

[54] DISTILLING APPARATUS

[76] Inventor: Philip G. Youngner, 919 18th St., SE., St. Cloud, Minn. 56301

[21] Appl. No.: 319,461

[22] Filed: Nov. 9, 1981

Related U.S. Application Data

[63] Continuation-in-part of Ser. No. 195,662, Oct. 9, 1980, abandoned.

[51] Int. Cl.³ .......................... B01D 3/10; B01D 5/00
[52] U.S. Cl. .............................. 202/185 A; 202/202; 202/205; 202/235; 202/181; 203/1; 203/11; 203/19; 203/26; 203/DIG. 1; 203/DIG. 4; 203/DIG. 13; 435/287
[58] Field of Search ................. 202/181, 185 A, 205, 202/202, 235, 185 R, 234; 203/DIG. 4, 26, 1, DIG. 14, DIG. 1, DIG. 13, 10, 11, 100, 19, 98; 435/287, 813, 161-165

[56] References Cited

U.S. PATENT DOCUMENTS

| | | | |
|---|---|---|---|
| 585,365 | 6/1897 | Skiffington | 202/185 A |
| 2,446,880 | 8/1948 | Kleinschmidt | 203/26 |
| 3,206,380 | 9/1965 | Daviau | 202/185 A |
| 3,528,890 | 9/1970 | Brown | 202/185 A |
| 3,608,279 | 9/1971 | West | 202/185 A |
| 3,674,652 | 7/1972 | Brown | 203/11 |
| 3,699,006 | 10/1972 | Hasslacher | 203/DIG. 4 |
| 3,846,254 | 11/1974 | Sephton | 203/11 |
| 4,159,227 | 6/1979 | Sundguist | 202/181 |
| 4,235,678 | 11/1980 | McKeen | 203/DIG. 4 |
| 4,269,664 | 5/1981 | Youngner | 202/185 A |

*Primary Examiner*—Wilbur L. Bascomb, Jr.
*Attorney, Agent, or Firm*—Lawrence M. Nawrocki

[57] ABSTRACT

Distilling equipment comprising input apparatus (21) including a boiling chamber (83) and means (80–82, 104–107, 110, 111) for supplying raw liquid to the boiling chamber at a predetermined level, a closed condensation chamber (22) above the predetermined level and connected to the top of the boiling chamber (96) to receive therefrom only vapor from the raw liquid, and output apparatus (20) including a liquid collection container (25) below the condensation chamber and liquid circulating structure (29–34, 44–55) for withdrawing liquid from the container, cooling the liquid, discharging it within the condensation chamber, and returning it to the container.

12 Claims, 8 Drawing Figures

DISTILLING APPARATUS

CROSS-REFERENCE TO RELATED APPLICATION

This applicaton is a continuation-in-part of applicant's copending application Ser. No. 195,662, filed Oct. 9, 1980, and now abandoned.

TECHNICAL FIELD

This invention relates to the field of chemical engineering, and particularly for intermediate-scale distilling applications such as deriving potable water from a source which because of non-volatile pollutants is saline or otherwise not potable, or for deriving alcohol of tractor-fuel grade as a byproduct of agricultural operations.

BACKGROUND OF THE INVENTION

Distillation, and fractional distillation, are well-known processes in chemical engineering. Apparatus and procedures for this use are known in laboratory type embodiments and in large scale commercial installations. There are, however, applications where these chemical procedures would be advantageous if intermediate-scale apparatus were available for reliable, trouble-free use requiring minimum supervision. One such application is the provision of potable water for individual farms and ranches in areas of the country where the natural water contains enough dissolved minerals to be unpleasant or physiologically unacceptable for drinking. Another application is the derivation, from suitable agricultural refuse at individual farms, of alcohol of purity adequate for use as a fuel for tractors and other engines.

In these applications it is desirable to have the distillation equipment of limited dimensions so that it can be installed in small buildings. Equipment having tall towers is not feasible for installations of this sort: the well-known "barometric height" to which water, or water-and-alcohol, rises under a substantial vacuum, makes apparatus using such principles undesirable.

SUMMARY OF THE INVENTION

A system embodying the present invention comprises treated liquid output apparatus and raw liquid input apparatus, interconnected at a condensation chamber. The output apparatus comprises a generally vertical treated liquid supply column and a generally vertical treated liquid return column, interconnected near their tops for liquid flow through a portion of the condensation chamber, and the inlet apparatus comprises a generally vertical raw liquid boiling chamber having an upward extension connected to the condensation chamber near its top, to provide a path for material in vapor form only from the boiling chamber to the condensation chamber, without enabling movement therebetween of liquid material. The input apparatus draws raw liquid from a suitable source, heating it as necessary, and later discharges it at a lower temperature and a higher pollution concentration. The output apparatus recirculates treated liquid from a collection container, cools it as necessary to maintain its temperature at a lower level than that of the raw liquid, and later returns it to the container. Externally energized pumps are provided for maintaining operation of the system.

Several modifications of the invention are shown.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

DESCRIPTION OF THE PREFERRED EMBODIMENTS

Figure 1:
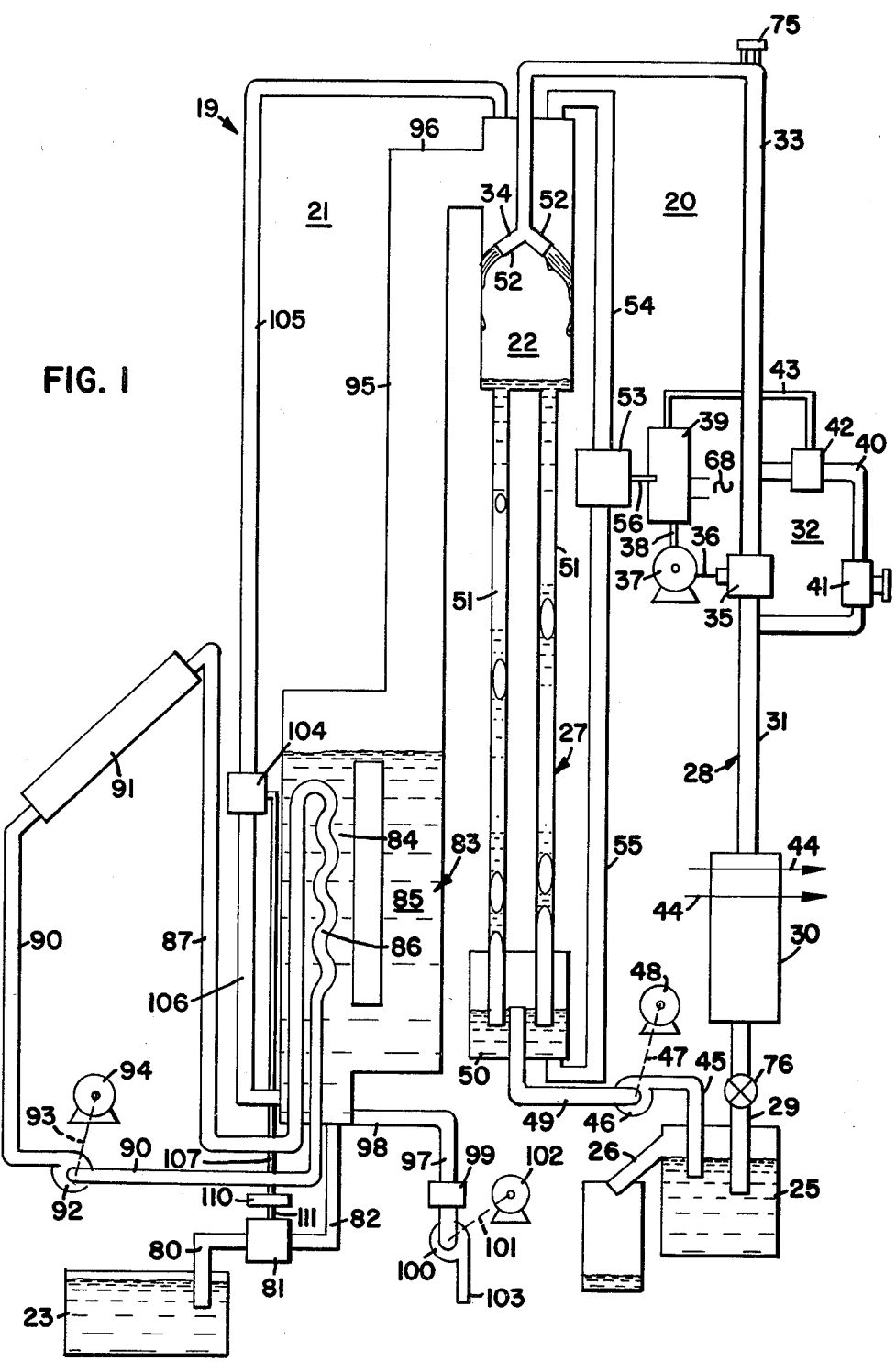
FIG. 1 is a schematic showing of a distillation system embodying the invention.

Turning first to FIG. 1, a water distillation system 19 according to the invention is shown to comprise output apparatus 20 and input apparatus 21 having in common a condensation chamber 22. The system operates to take raw water from a source 23 open to the atmosphere, such as a pond or well, and to deliver treated water to a collection container 25 also open to the atmosphere, and having an overflow 26 from which the liquid output of the system is taken.

Output apparatus 20 comprises means for circulating treated water at subambient temperature to cool the condensation chamber, and includes a treated water supply column 27 and a treated water return column 28. The columns are both generally vertical, and may, for example, be six feet in height.

Return column 28 comprises in sequence a conduit 29, a heat exchanger 30, a conduit 31, a control arrangement 32, a conduit 33, and a distributor 34 in chamber 22.

Control arrangement 32 includes a throttling valve 35 actuated through a mechanical connection 36 by a low-speed reversing A.C. motor 37 actuated through a cable 38 by a controller 39: valve 35 is bypassed by a loop 40 including a manual throttling valve 41 and a normally closed solenoid valve 42 actuated through a cable 43 by controller 39. It is understood that heat exchanger 30 is externally provided with cooling fluid, as suggested by arrows 44.

Supply column 27 extends from container 25 through a conduit 45, a positive displacement pump 46 driven uniformly through a mechanical connection 47 by a motor 48, and an inlet conduit 49 having an inlet port in a closed chamber 50, to a plurality of separate conduits 51 projecting below and sealed into the top of chamber 50, and sealed into and flush with the bottom of condensation chamber 22. The surface of the liquid in container 25 is to lie above the lower ends of conduits 29 and 45. The surface of the liquid in chamber 50 is to lie above the lower ends of conduits 51, so that the inlet port of inlet conduit 49 is higher in chamber 50 than the lower ends of conduits 51.

Distributor 34 comprises a plurality of nozzles 52 directed downwardly and toward the walls of the lower portion of chamber 22.

Figure 2:
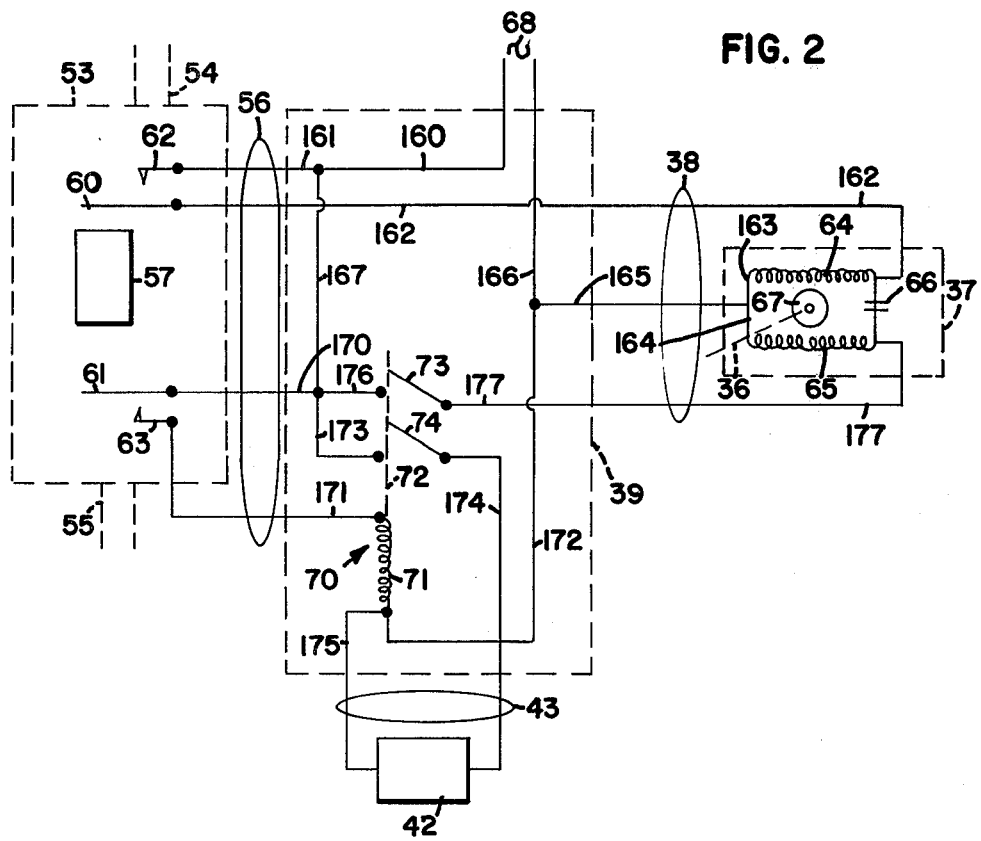
FIGS. 2 and 5 show control circuits useful in the invention.

A liquid level sensor 53 is connected by conduits 54 and 55 to the top of chamber 22 and the bottom of chamber 50, respectively, and is connected by a cable 56 to controller 39, as is best shown in FIG. 2. Here sensor 53 is shown to comprise a float 57 and a pair of vertically spaced movable contacts 60 and 61 which are normally out of engagement with a pair of fixed contacts 62 and 63, respectively. When the liquid rises above a first level, float 57 moves contact 60 into engagement with contact 62, and when the liquid falls below a second level float 57 moves contact 61 into engagement with contact 63. Motor 37 is shown to comprise a pair of windings 64 and 65, a capacitor 66, and a rotor 67. Control of valve 42, and reversible control of motor 37, from an A.C. source 68, are exercised by sensor 53, in part through a relay 70 comprising a winding 71 which actuates an armature 72 to close a pair of normally open contact sets 73 and 74.

A normally closed tap 75 and a shut-off valve 76 in conduit 29 may be provided for priming the output apparatus with potable water.

Returning to FIG. 1, input apparatus 21 includes a conduit 80 extending below the surface of the liquid in source 23, a normally closed solenoid valve 81, and a conduit 82 opening into a boiling chamber 83 having laterally displaced vertical branches 84 and 85. Branch 84 includes a heat exchanger 86 connected by conduits 87 and 90, sealed into the bottom of the chamber, to a solar heating panel 91: a pump 92 driven through a mechanical connection 93 by a motor 94 is included in conduit 90. Chamber 83 has an upward extension 95, above branch 85, which has a connection 96 to the upper part of condensation chamber 22, and which may contain refluxing material such as glass beads or metal mesh.

At the bottom of boiling chamber 83 there is a drain connection 97 including a conduit 98, a check valve 99 opening away from chamber 83, and a pump 100 driven through a mechanical connection 101 by a motor 102 to discharge liquid at 103.

A second liquid level sensor 104 is connected by conduits 105 and 106 with the top of condensation chamber 22 and the bottom of boiling chamber 83 respectively, and actuates valve 81 through a suitable cable 107, controller 110, and cable 111 as described for valve 42.

Figure 3:
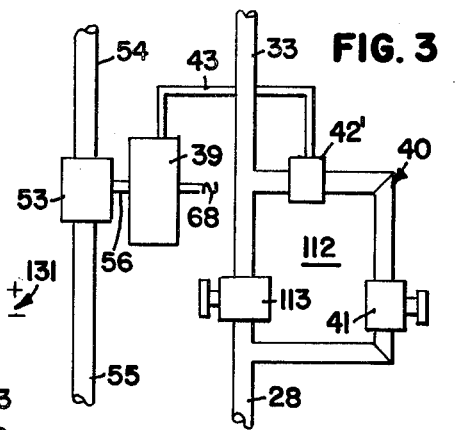

Turning now to FIG. 3, a first modified control arrangement 112 is shown to comprise a manual throttling valve 113 bypassed by loop 40 including throttling valve 41 and normally open solenoid valve 42' controlled through cable 43 by a controller 39, which is in turn controlled through cable 56 by level sensor 53. In this modification valve 113 is not motor driven.

Figure 4:
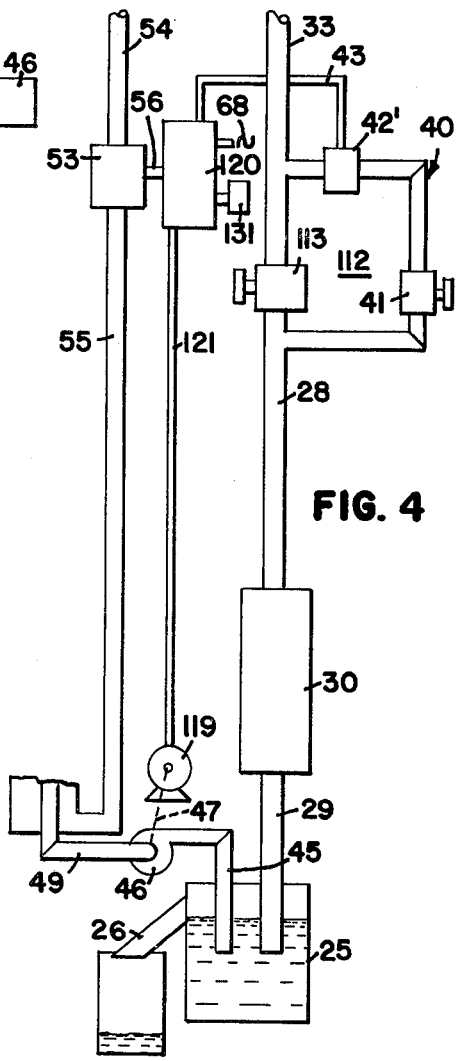

A further modified system is shown in FIG. 4 to include a control arrangement 112 as just described. A controller 120 is energized by sensor 53 through cable 56 to energize valve 42' through cable 43, as before, and is also connected by a cable 121 to control the operation of a D.C. motor 119, so that the speed of pump 46 varies with the level sensed by sensor 53.

Figure 5:
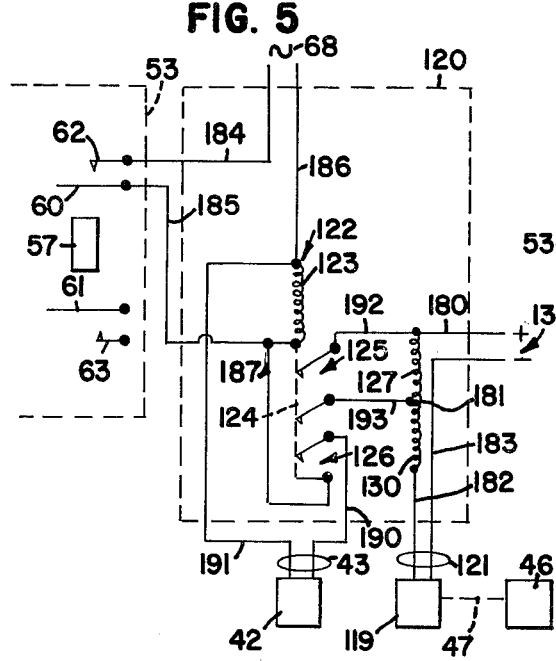

As shown in FIG. 5, contacts 61 and 63 of sensor 53 are not used in this arrangement. Controller 120 comprises a relay 122, having a winding 123 which actuates an armature 124 to close a pair of normally open contact sets 125 and 126, and a pair of resistors 127 and 130. The controller is energized from A.C. source 68, and from a D.C. source 131.

Figure 8:
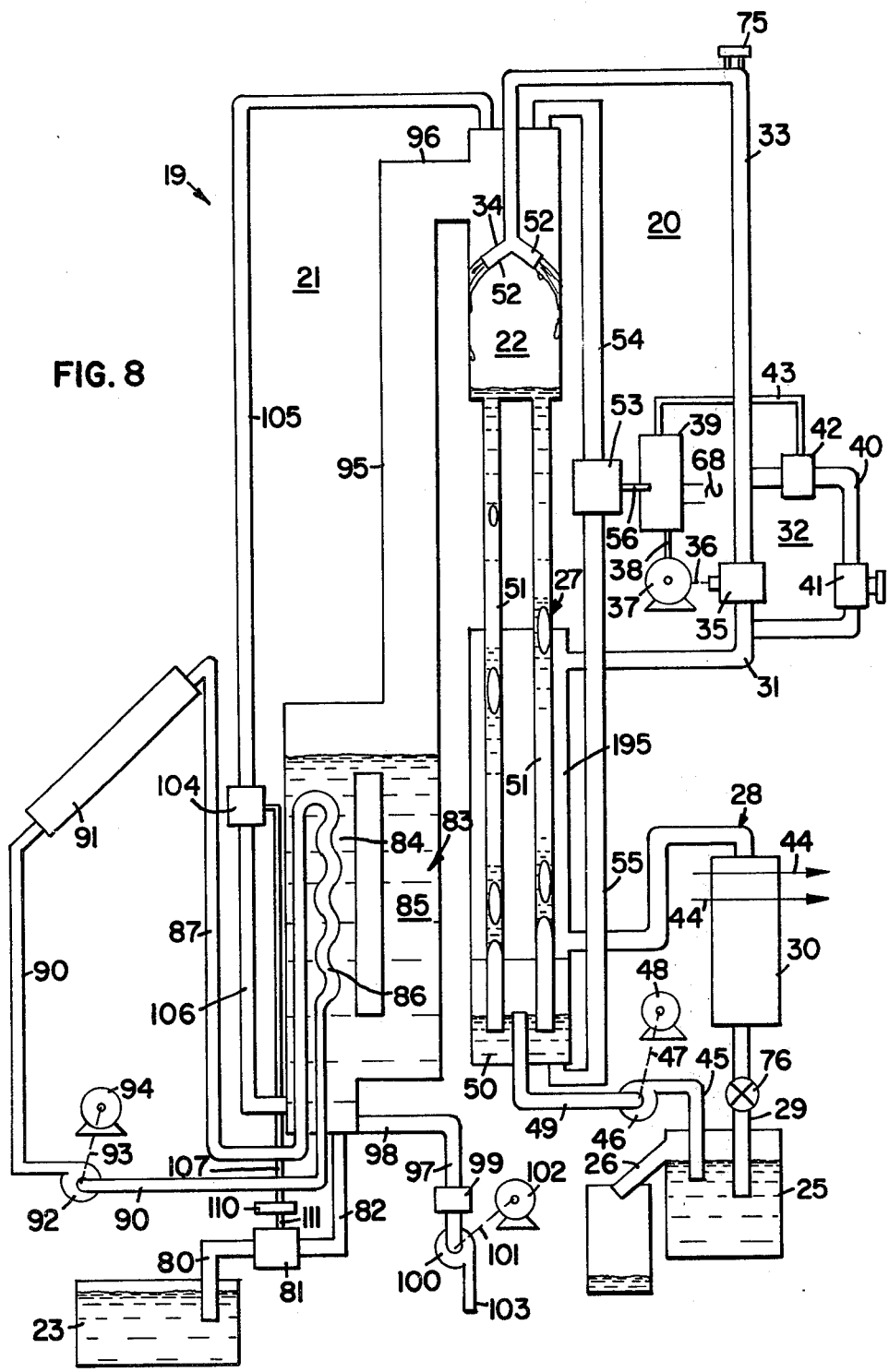

FIG. 8 illustrates another modification of the system which affects output apparatus 20. Return column 28 can further comprise a plenum 195 which has portions of conduits 51 passing therethrough. Plenum 195 is disposed sequentially intermediate heat exchanger 30 and conduit 31.

Figure 6:
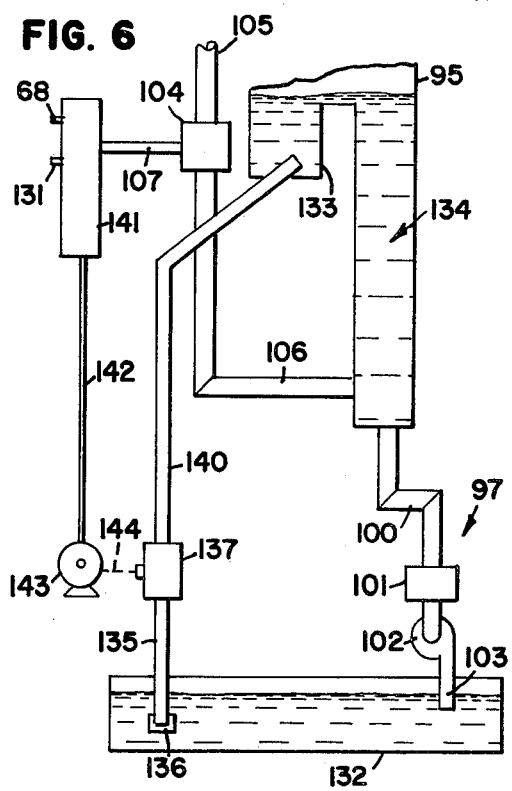

A still further modification of the system is shown in FIG. 6. Here a source of liquid, which may be a fermentation mash—a mixture of ethyl alcohol, water, sugar solution, yeasts, and other carbohydrates—is shown at 132. This liquid is understood to be warmed, by the sun or some other source of heat, to maintain a proper temperature for fermentation. The fluid from source 132 is conducted to branch 133 of boiling chamber 134 by a conduit 135, which may include an input strainer 136, a motor driven throttling valve 137, and a conduit 140 which is sealed into branch 133 at an angle, to direct liquid emerging therefrom obliquely against the wall of the chamber. Level sensor 104 is connected by a cable 107 to a controller 141 like controller 39 in FIG. 1, which acts through a cable 142 to control a motor 143 to actuate valve 137 through a mechanical connection 144 as described in connection with valve 35 of FIG. 1. Pump 102 discharges into source 132.

Figure 7:
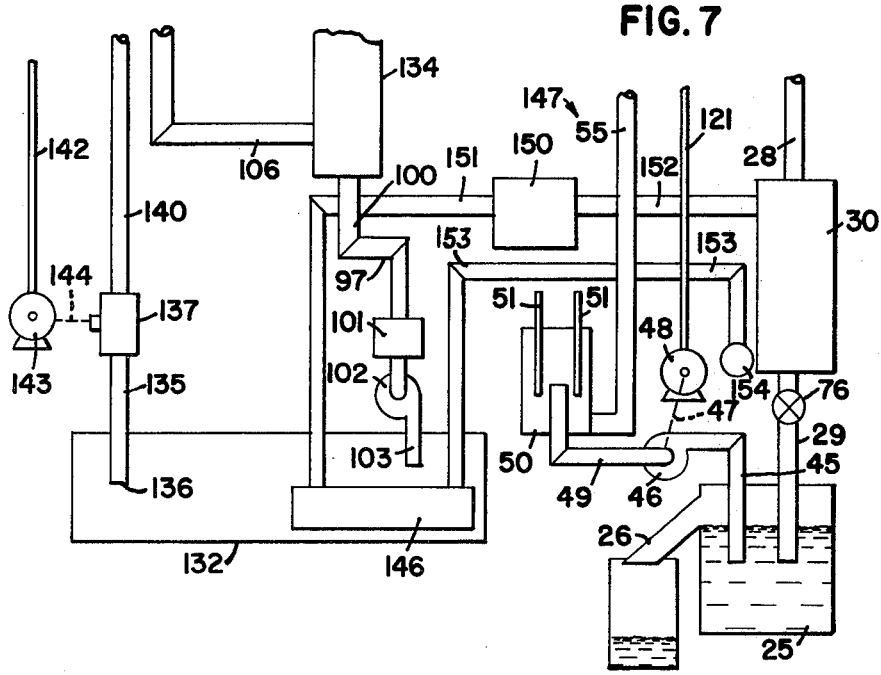
FIGS. 3, 4, 6, 7, and 8 show modifications of the apparatus of FIG. 1.

FIG. 7 shows how the thermal efficiency of the system shown in FIGS. 1 and 6 may be improved. Here a heat exchanger 146 is submerged in the mash in source 132, to act as the condenser of a heat pump 147 having a compressor 150 connected to heat exchanger 146 by a conduit 151 and to heat exchanger 30, which comprises the evaporator of the heat pump, by a conduit 152, the path for refrigerant being completed by conduit 153 and an expansion valve 154. This improves the thermal efficiency of the system by providing heat for warming the mash or raw water.

OPERATION

The operation of the system is as follows, referring first to FIGS. 1 and 2. Motor 48 is driving pump 46 to create a negative pressure in conduit 49, which is transmitted through chamber 50 and conduits 51 to condensation chamber 22. Atmospheric pressure acts on the liquid in container 25 to force treated water upward through heat exchanger 30, where it is cooled, and through control arrangement 32 to nozzles 52, the rate of flow being determined by arrangement 32 under the control of level sensor 53. Atmospheric pressure on the liquid in source 23 is also available to force raw water upward into boiling chamber 83 whenever valve 81 is open.

Pump 92 is running to circulate heat exchange liquid through solar heating panel 91 and heat exchanger 86, so that the temperature of the raw liquid in chamber 83 is superambient, while that from nozzle 52 is subambient.

A pumping action takes place in supply column 27, to augment operation of pump 46, as will now be described. Liquid is supplied through nozzles 52 to chamber 22 at such a rate that its entrance into conduits 51 is turbulent, and the flow down the conduit comprises mixed streams of liquid masses interspersed with gaseous bubbles carried downwardly with the liquid by gravity and by pump 46. It is important to note that a considerable number of conduits of small diameter are used here, rather than a single large conduit, to ensure adequate extraction from chamber 22 of bubbles which are principally of water vapor, but may also include any air initially in the system or brought into the system dissolved in the raw water. After a short period of initial operation, the pressure in chamber 22 is substantially the partial pressure of water at a subambient temperature, the pressure in extension 95 is that of the partial pressure of water at the superambient temperature, which is greater, and water vapor moves from extension 95 to chamber 22, to condense on the cooler walls and the cooler water therein, and pass downward through conduits 51, chamber 50, and pump 46 into container 25. Here any component such as air which has not condensed is free to bubble to the surface.

It is clear that the pressure in chamber 22 is essentially the vapor pressure of water at the subambient temperature. If that low pressure were also present at pump 46, the natural liquid seal of the pump would be destroyed by boiling of the liquid. This is prevented by the construction of supply column 27, which presents a pressure head equal to the height of a column of water of the length of conduits 51 less the total length of the bubbles in the conduits. The conduit length is chosen to provide a head of several feet, sufficient to prevent boiling of the liquid in the pump, and satisfactory sealing is accomplished.

The operation of arrangement 32 to regulate liquid flow at nozzle 52 will now be explained. Sensor 53 is positioned at a level slightly below the bottom of chamber 22, since it has been found that in the length of this column approximately one foot is occupied by vapor bubbles rather than liquid. The main liquid flow through arrangement 32 is through throttle valve 35, with a subordinate flow through throttle valve 41 when solenoid valve 42 is open.

If the liquid level at sensor 53 becomes too high, float 57 in sensor 53 rises, closing contacts 60 and 62 to complete a circuit which may be traced in FIG. 2 from source 68 through conductors 160 and 161, contacts 62 and 60, and conductor 162 to motor winding 64 directly, and to motor winding 65 through capacitor 66, the circuit being completed through conductors 163 and 164, 165, and 166. At this time valve 42 is not energized. Motor 37 operates slowly in a direction to close valve 35, thus reducing the rate at which liquid can flow to distributor 34. Continued operation of pump 46 causes the level of liquid to decrease, and sensor float 57 disengages contact 60 from contact 62 to interrupt motor operation, so that liquid flow continues at the slightly lesser rate resulting from the new position of valve 35.

If the liquid level at sensor 53 becomes too low, float 57 descends, closing contacts 61 and 63 to complete a circuit which may be traced from source 68 through conductors 160, 167, and 170, contacts 61 and 63, and conductor 171 to relay winding 71, the circuit being completed through conductors 172 and 166. Relay 70 operates to complete a first circuit, form conductor 167 through conductor 173, contact set 74, and conductor 174 to valve 42, the circuit being completed through conductors 175, 172, and 166 so that valve 42 is opened. Relay 70 also completes a second circuit, from conductor 177 to motor winding 65 directly and to motor winding 64 through capacitor 66, the circuits being completed through conductors 163 and 164, 165, and 166. Motor 37 operates slowly in a direction to open valve 35, and open valve 42 also passes fluid at a rate determined by the setting of manual throttle valve 41. The increased flow of liquid causes the liquid level to rise, and sensor float 57 disengages contact 61 from contact 63 to interrupt motor operation and enable closure of valve 42, so that liquid flow continues at the slightly greater rate resulting from the new position of valve 35.

Proper manual setting of throttle valve 41 can result in quite stable system operation in which valve 35 reaches a setting which is very close to that providing exactly the correct liquid flow, and operations of controller 39 are infrequent and short.

In FIG. 2, conductors 161, 162, 170 and 171 comprise cable 56 of FIG. 1, conductors 162, 165, and 177 comprise cable 38, and conductors 174 and 175 comprise cable 43.

Since the water vapor from extension 95 is continuously condensing by contact with the cooler walls of chamber 22 and the cool water from nozzles 52, a continuous flow of water in vapor phase passes out of boiling chamber 83. The level of water in this chamber is maintained by sensor 104, which energizes valve 81 to open and close as the liquid reaches lower and upper levels.

Valve 81 is normally closed. if the liquid at sensor 104 drops to a predetermined level, the sensor float operates to open valve 81 as described in connection with valve 42, enabling the reduced pressure above boiling chamber 83 to draw liquid from source 23 into the chamber. When the liquid regains a desired level sensor 104 de-energizes valve 81, which closes to prevent further input of water into boiling chamber 83.

Because of the continuous evaporation, the pollution content in boiling chamber 83 continuously rises, which also raises the boiling point of the liquid. To maintain stable system operation, pump 100 is operated from time to time to draw some liquid from the bottom of chamber 83 and discharge it to a waste, replacement of water being caused by sensor 104 as the level descends. Pump 100 and check valve 99 are necessary because operation of pump 46 would prevent outflow of liquid through conduit 98, and might even draw waste in through conduit 103 and the pump.

If desired, operation of pump 100 may be automated by providing a conductivity sensor in chamber 83 to energize and de-energize motor 102.

The operation of the modification of the invention shown in FIG. 3 will now be apparent, as it is simply a less complicated arrangement which omits the motor control of one throttle valve. In this arrangement throttle valve 113 is manually set to provide slightly less than the necessary flow, and manual valve 41 is set to augment the flow, when valve 42 is open, by slightly more than the amount required for exact system operation. Level control is now accomplished by automatic opening or closing of valve 42. This gives a system which is continuously hunting, and is thus in this respect less perfect than that of FIG. 1. It is less costly to install and maintain, however, and is usable where initial system cost is a serious practical consideration.

The embodiment of the invention shown in FIG. 4 operates in generally the same fashion, except for control of liquid flow in the output apparatus. Resistors 127 and 130 of FIG. 5 are so chosen that normally motor 119 is energized through a circuit which may be traced from D.C. source 131 through conductor 180, resistor 127, junction point 181, resistor 130, conductor 182, motor 119, and conductor 183 to source 131, and the motor operates to drive pump 46 at a predetermined low speed. Valves 41 and 113 are set so that slightly more than enough liquid is passed at this pump speed to maintain the level. As the level rises, float 57 causes contact 60 to engage contact 62, and a circuit is completed from source 68 through conductor 184, contacts 62 and 60, and conductor 185 to relay winding 123, the circuit being completed through conductor 186. Relay 122 operates, completing a circuit from conductor 185 through conductor 187, contact set 126, and conductor 190 to valve 42, the circuit being completed through conductors 191 and 186, and valve 42 closes to reduce the flow of additional liquid determined by valve 41. At the same time, relay 122 closes contact set 125 to short-circuit resistor 127 through conductors 192 and 193, increasing the speed at which motor 119 drives pump 46 to further increase the liquid flow and lower the liquid level to a point where fall of float 57 enables contact 60 to disengage contact 62, relay 122 is de-energized, valve 42 opens, and motor 48 reverts to its lower speed.

The modification of return column 28 as illustrated in FIG. 8 can be used with any embodiment heretofore described. The liquid in container 25 will be forced upwardly through heat exchanger 30 and into plenum 195 prior to entering conduit 31 and control arrangement 32. Since the treated liquid is passed through heat exchanger 30 prior to its entering plenum 195, its temperature will be lower than the temperature of the condensed liquid passing downwardly through conduits 51 and into chamber 50. Consequently, a heat exchange process will occur in plenum 195 wherein the temperature of the condensed vapor passing down conduits 51 will be reduced.

The significance of the decreased temperature of the condensed vapor is that the distillate entering pump 46 is colder than it would otherwise be. The fluid entering pump 46 should be as cold as possible in order to inhibit any boiling action in the pump which might be induced by the vacuums in condensation chamber 22 and chamber 50. Such boiling action could have the adverse effect of destroying the seal in the pump and causing loss of lubrication.

The embodiment of the invention shown in FIG. 6 is adapted for use where the raw liquid to be treated is already at a superambient temperature, so that additional heat from a heat exchanger is not needed. It also shows a modification of the boiling chamber designed to introduce raw water in such a way as to create a whirling vortex in one branch of the chamber; such an arrangement is very effective in suppressing the spray which otherwise might occur and be carried or projected up into the chamber extension 95, with danger of contaminating the apparatus.

In FIG. 6 the pressure in chamber 134 is lowered as described in connection with FIG. 1, drawing raw liquid upward from source 132 through valve 137. If the liquid affecting sensor 104 rises to a first level, controller 141 acts as described above to energize motor 143 in a sense to close valve 137, reducing the flow from source 132 so that the level at sensor 104 drops and motor 143 is de-energized in a slightly different position of valve 137. On the other hand, if the liquid affecting sensor 104 falls to a second level, controller 141 acts as described above to energize motor 143 in the sense to open valve 137, increasing the flow from source 132 so that the level at sensor 104 rises and motor 143 is again de-energized.

FIG. 7 shows portions of FIGS. 1 and 6 interconnected by heat pump 147, and those portions operated as previously described. The heat pump operation is as follows: operation of compressor 105 draws gaseous refrigerant from heat exchanger 30 through conduit 152, compresses it, and discharges it as a liquid to condenser 146, where it gives up its heat to the mash or raw water. The cooled refrigerant flows through conduit 153 to expansion valve 154 which admits it to evaporator 30, where its transformation from a liquid to a gas cools the liquid in the evaporator. The electrical energy required to operate heat pump 147 is very considerably less than the amount of energy which would be required to raise the temperature of the mash in source 132 to the same extent by direct heating.

It is to be understood that when the apparatus is being used for fractional distillation to produce alcohol, the end product is not intended to be absolute alcohol: the partial pressures of alcohol vapor and water vapor under vacuum are such that for a practical temperature of liquid mash they are equal when water vapor comprises about 7% of the total, and no pure alcohol is obtainable by this apparatus. Ninety-three percent alcohol is, however, a very satisfactory fuel for tractor engines and similar uses, and is readily obtainable from a suitable mash using the apparatus of the invention.

From the foregoing it will be evident that the invention comprises a system for unattended distillation or fractional distillation, the system incorporating a novel vacuum pumping arrangement for maintaining the seal of a positive displacement pump when used to convey liquid and vapor at subambient pressures, and much of the energy required being derived from the temperature difference between a raw liquid and a treated liquid resulting therefrom. A great advantage of the system is its low cost of operation.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principal of the invention, to the full extent indicated by the broad general meaning of the terms in which the appended claims are expressed.

What is claimed is:

1. Distilling apparatus comprising, in combination:
   input apparatus including a boiling chamber and means for supplying raw liquid to said boiling chamber at a predetermined level;
   a closed condensation chamber above said predetermined level connected to the top of said boiling chamber and communicating therewith so as to receive therefrom only vapor from said raw liquid;
   output apparatus including a liquid collection container below said condensation chamber and communicating therewith to receive liquid from said condensation chamber, and liquid circulating means moving liquid from said container, cooling the liquid, discharging it within said condensation chamber, and allowing the liquid to drain from said condensation chamber with liquid condensed from said raw liquid vapor so as to entrain bubbles of gas therein and provide a pressure head in said output apparatus as said liquids drain to said container, wherein said condensation chamber is cooled by liquid from said container and a subambient pressure is created within said boiling and condensation chambers;
   circulation and vacuum creation augmentation pump means interposed in said output apparatus to further facilitate creation of said subambient pressure in said boiling and condensation chambers;

a second closed chamber interposed in said output apparatus below said condensation chamber;

a plurality of conduits extending downward from said condensation chamber into said second closed chamber; and an inlet conduit from said pump means extending into said second closed chamber, and having an inlet port in said second closed chamber, the tops of said plurality of conduits being level with the bottom of said condensation chamber, and the bottoms of said plurality of conduits being below said inlet port of said inlet conduit in said second closed chamber.

2. Apparatus according to claim 1 wherein said output apparatus further comprises a plenum enclosing at least a portion of said plurality of conduits, and wherein cooled liquid circulates through said plenum after being drawn from said container and before being discharged into said condensation chamber.

3. Apparatus according to claim 1 including a heat pump arranged to transport heat from said output apparatus to said input apparatus.

4. Apparatus according to claim 1 in which the length of said conduits is chosen to provide sufficient pressure head at said pump to prevent loss of liquid sealed therein by boiling of said liquid.

5. Apparatus according to claim 1 further comprising:

means, operatively connected across said condensation chamber and said enclosed chamber, for sensing liquid level in a column including said condensation chamber, said plurality of conduits, and said second closed chamber; and means, responsive to the liquid level sensed by said sensing means, for regulating the flow of liquid in said circulating means.

6. Apparatus according to claim 5 in which said output apparatus includes conduit means connecting the top of said condensation chamber with the bottom of said second closed chamber, and said liquid level sensing means is connected in said conduit means above the level of said second closed chamber.

7. Apparatus according to claim 5 in which said circulation means includes a first throttle valve, a loop bypassing said first valve and including a normally closed solenoid valve, a controller connected to said liquid level sensing means, and means connecting said controller in controlling relation to one of said valves.

8. Apparatus according to claim 7 in which said controller is connected to said throttle valve.

9. Apparatus according to claim 7 in which said controller is connected to said solenoid valve.

10. Apparatus according to claim 7 in which said controller is connected to said throttling valve and to said solenoid valve.

11. Apparatus according to claim 5 in which said liquid circulation means includes said pump, means a controller connected to said liquid level sensing means, and means connected to said controller for controlling the speed of operation of said pump.

12. Apparatus according to claim 11 in which said circulation means includes a first throttling valve and a loop bypassing said first valve and including a normally open solenoid valve, and in which said controller is also connected to said solenoid valve.

* * * * *

UNITED STATES PATENT AND TRADEMARK OFFICE
CERTIFICATE OF CORRECTION

PATENT NO. : 4,444,623
DATED : Apr. 24, 1984
INVENTOR(S) : Philip G. Youngner

It is certified that error appears in the above-identified patent and that said Letters Patent are hereby corrected as shown below:

In Col. 7, line 67, change "105" to --150--.

In Col. 10, line 19, change "throttle" to --throttling--.

Signed and Sealed this

Fourteenth Day of August 1984

[SEAL]

Attest:

GERALD J. MOSSINGHOFF

Attesting Officer   Commissioner of Patents and Trademarks